March 3, 1970     J. M. PINDER ET AL     3,498,316
POSITIVE POSITION PINCH VALVE
Filed April 8, 1968
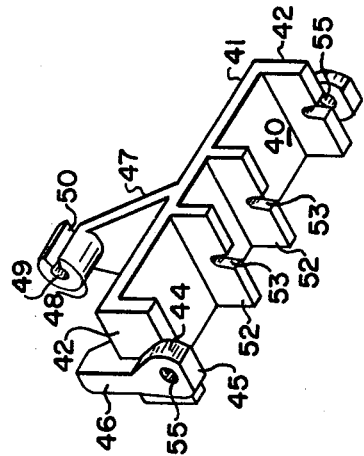
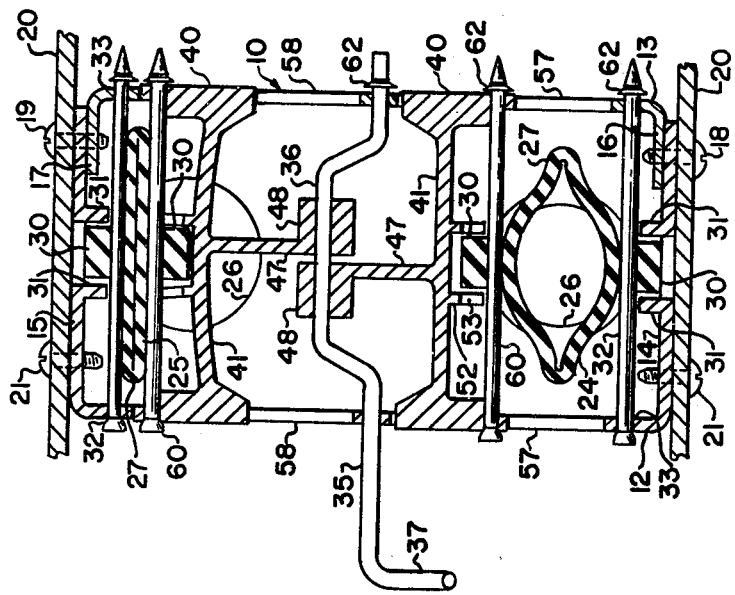
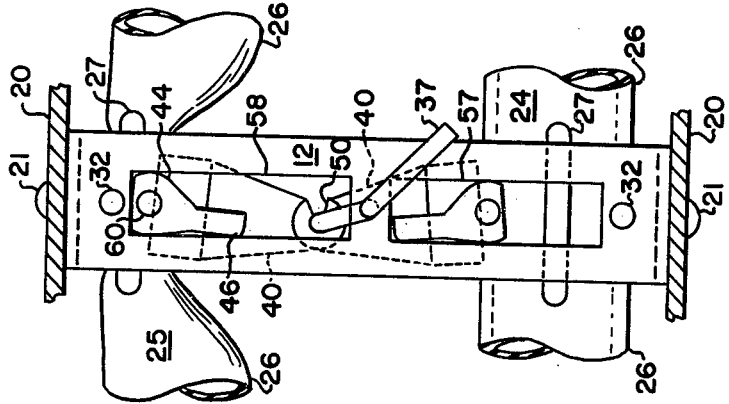

United States Patent Office 3,498,316
Patented Mar. 3, 1970

3,498,316
POSITIVE POSITION PINCH VALVE
James M. Pinder, North Canton, and Warren A. Humphrey, Canton, Ohio, assignors to Hoover Company, North Canton, Ohio, a corporation of Delaware
Filed Apr. 8, 1968, Ser. No. 719,358
Int. Cl. F16l 55/14
U.S. Cl. 137—595                                    8 Claims

ABSTRACT OF THE DISCLOSURE

A pinch valve structure for controlling flow through fluid conduits comprising a collapsible conduit, pinch means for collapsing the conduit to interrupt fluid flow and an operating mechanism for the pinch means comprising a driving crank operating a single plastic molding of resilient plastic material which acts to pinch the conduit closed and includes portions functioning as a crank bearing, a connecting rod, side thrust bearings, rocking and sliding bearings, positioning guides for the collapsible conduit, positive stop for the open and closed conduit positions, a snap action spring for holding the conduit closed and tolerance take-up means. The valve element is so made that it acts as a snap spring in its open position to hold the operating means in valve open position.

BACKGROUND OF THE INVENTION

The present invention relates to improvements in pinch valves for use in fluid flow systems where sterile conditions must be maintained or the confined fluid must be maintained hermetically sealed or where it is desirable that the fluid be free of contact with movable parts or where maximum economy is desirable. Such valves are especially economical for controlling various fluid conduits in domestic washing machines, for example, to control flow of fluids between washing and extracting chambers and the flow to waste.

Pinch valves in general and in domestic washing machines are known to the art but present valves of that nature involve rather costly mounting and operating devices and are not well suited to manual actuation and some types of automatic operation. Prior devices also lack the positive open and closed actuation taught by the present invention.

SUMMARY

Our invention comprises a pinch valve and its operating mechanism which may be assembled into an operating unit in a simple inexpensive metal or plastic frame which may be U-shaped for a single valve element or a closed rectangle for single or multiple valve elements. The drive mechanism includes a spring element in the means for pinching the valve element which acts as a "snap" spring to hold the operating means in a fixed position when the valve element is fully closed and as a tolerance take-up means. The valve element is molded in nearly closed position and is positively opened by the operating means. The stress force in the valve element itself when in open position acts as a spring to "snap" the operating means to a fixed valve open position and to retain it there. More specifically a single molded plastic element of resilient material is provided which performs the functions of several bearings, snap spring, fixed stop guide and valve pinch means.

It is a particular object of our invention to provide a simple, rugged, reliable and economical pinch valve assembly for fluid flow systems and more particularly for controlling fluid and granular material flow passages in washing machines characterized by a small number of readily produced parts and functioning positively to open and close the valve and to fix the parts positively in valve open and closed positions with a snap action.

BRIEF DESCRIPTION OF THE DRAWING

Other and more specific objects of our invention will become apparent as the description proceeds in the following specification and the drawing in which:

FIGURE 1 is a view in elevation partly in section, of a double valve assembly embodying our invention.
FIGURE 2 is a side elevation of FIGURE 1, and
FIGURE 3 is an isometric view of a one piece actuating element.

DESCRIPTION OF THE PREFERRED EMBODIMENT

Referring particularly to FIGURES 1 and 2 of the drawing there is illustrated a valve assembly 10 comprising two valves each embodying a preferred form of our invention. The valve assembly 10 has a frame including a pair of facing plates 12 and 13. Plate 12 has legs 14 and 15 extending from the opposite ends thereof which overlap short legs 16 and 17 projecting from opposite ends of plate 13. The overlapping portions of the legs 14–16 and 15–17 may be joined together by any suitable means here shown as studs 18 and 19 which may also be used to secure the valve structure to a member 20 of any assemblage, a washing machine, for example, in which it is to be used. Studs 21 are also shown as securing the legs 14 and 15 to the members 20.

The valve elements 24 and 25 are preferably made of molded rubber. Valve elements 24 and 15 each comprise cylindrical end portions 26 extending outwardly from a flattened and widened central pinch portion 27. The valve elements are molded preferably of rubber and are molded in nearly closed position to prevent the generation of large, short radius stresses at the reverse bends at the side edges of the flattened portions 27 when in closed position as shown for valve 25. Since the valve elements 24 and 25 are in slightly open position when unstressed, they are stressed toward closed position when held in the open position in which valve element 24 is shown.

Integral projections 30 extend outwardly from the center of the opposite sides of the flattened pinch portions 27 of each valve. The projections 30 on the sides of valve elements 24 and 25 facing the legs 14 and 15, respectively, are positioned between tongues 31 struck inwardly from legs 14 and 15 to position the valve elements centrally of plates 12 and 13. The projections 30 positioned between tongues 31 are pierced by pins 32 received in aligned holes 33 in the plates 14 and 15. The pins 32 are spaced from the free ends of tongues 31 to prevent contact therebetween even if the pins should flex slightly when the valve is closed.

The operating mechanism for the valves comprises a power element here illustrated as a shaft 35 journalled in plates 12 and 13 and including an offset crank 36 midway between the plates. The end of shaft 35 projecting beyond plate 12 is here shown as including a handle 37 extending at a right to the shaft axis for manual actuation; however, any suitable means may be employed to operate shaft 35.

Each valve element is connected to and operated by a one piece operator 40 which is preferably molded from a resilient plastic material such as the poly acetol plastic currently marketed by the du Pont Company under the trademark "Delrin" and designation "100."

The operator 40 is generally T-shaped and comprises an elongated bar portion 41, forming the cross-bar of the T, which terminates at its ends in tongues 42 extending at right angles to the bar 41. Projecting from the outer face of each tongue 42 is a combined bearing and stop structure comprising a bearing 44 partly circular in outline having a flattened clearance surface 45 and joined to a stop 46 which extends beyond the bar portion 41. A connecting rod 47 projects from the central area of bar portion 40 and terminates at its free end in a crank bearing 48 having a journal bore 49. A flaring slot 50 opens through the side face of bearing 48 to bore 49 to permit the crank 36 to be snapped into the bore 49 as will be more fully explained hereinafter. A pair of tongues 52 project from the central portion of bar 41 opposite the connecting rod 47 and are spaced apart equally on each side of the center of operator 40. The connecting rod 47 is slightly to one side of the center of operator 40 and the bearing 48 projects from 47 away from the center of operator 40 in the illustrated embodiment of our invention. Each tongue 52 is provided with a clearance slot 53 at its center aligned with journal bores 55 in each bearing 44.

Each plate 12 and 13 is provided with identical slots 57 and 58 facing the corresponding slots in the other plate. With the plates assembled as shown in FIGURES 1 and 2, the valve elements 24 and 25 are assembled on pins 32. The crank shaft 35 is next threaded through the bearing holes provided for it in plates 12 and 13. The operators 40 are next installed by rocking them into position between the plates 12 and 13 while flexing them to provide clearance. When operators 40 are in position the outer faces of the tongues 42 form side thrust bearings aganst the facing surfaces of the plates 12 and 13 and the bearings 44 and stops 46 lie in the slots 57 and 58. With the operators 40 in place a pin 60 is passed through each pair of facing bores 55 and pierces the free projections 30 on the valve elements positioned between each pair of tongues 52. The bearings 48 are next assembled to crank 36 by snapping the crank 36 through slots 50 into bores 49. Push on fasteners 62 may optionally be aplied to the ends of pins 32 and 60 and of crank shaft 35 projecting through the plate 13. The fasteners 62 are optional as the friction between the projections 30 and the pins 32 and 60 will generally suffice to hold the pins in place and the crank 36 and bearings 48 will prevent displacement of the shaft 35 sufficiently to release it from plate 13.

Alternately the parts may be assembled by assembling each valve element with its associated operator 40 and pin 60. Then pins 32 are threaded through plate 12, for example, and the other projection 30 on the valve element. The shaft 35 is threaded through plate 12 and the bearings 48 are snapped onto the crank 36. A simple fixture may be used to position the pins 32, the operators 40 and the free end of shaft 35 while plate 13 is moved to the left as viewed in FIGURE 1 and secured to legs 14 and 15.

The pins 32 and 60 may be finish nails, as illustrated, or special headed pins. The shaft 35 may be a small diameter rod bent to form the crank 36 and handle 37.

It is apparent from the drawing that the elongated edges of each slot 57 and 58 forms a bearing surface engaging a portion of bearing surface 44 whereby the operators are mounted in the plates for sliding and rocking movement. The stops 46 are shown in FIGURE 2 in their final positions when valve 24 is open and valve 25 is closed and pinched (FIGURE 1) between pins 32 and 60. The dimensions of the parts are so chosen that in the closed position of the valve the distance from pin 32 to crank 36 is less than the sum of twice the wall thickness of the valve element plus the diameter of pin 60 plus the distance from pin 60 to the bore 49 in the associated operator 40 whereby the bar portion 41 of said operator is stressed and flexed as illustrated in FIGURE 1. The degree of flexure of bar 41 in FIGURE 1 is exaggerated for purposes of illustration.

The operation of our valve assembly is as follows: The shaft 35 is in one extreme of its arc of movement as illustrated in FIGURE 2 with valve 24 open and valve 25 closed. The shaft 35 can move from the illustrated position only clockwise as viewed in FIGURE 2. It is clear from FIGURE 2 that the crank 36 is slightly to the left of the vertical center line of plate 12. As the crank is moved clockwise it reaches a dead center position in which maximum stress is applied to the closed valve and to the bar 41 associated therewith. Further clockwise movement of shaft 41 causes the bearing parts 44 to rock and slide in the slots 57 and 58 as valve 25 is opened and valve 24 is pinched closed. As the crank 36 passes the lower dead-center position to close valve element 24 the stress in bar 41 causes the crank and its associated parts to snap to the limit of its movement in a clockwise direction until the stops 46 associated with valve element 25 are firmly against the left hand, as viewed in FIGURE 2, sides of slots 57. The total arc of motion allowed shaft 35 is slightly greater than 180° preferably in the range 190° to 210° to ensure positive holding of the crank in its limit positions by the stress in the bar 41 associated with the closed valve. The stress in the system holding the valve positively closed are augmented by the compression of the pinched valve element and the flexure of the associated pins 32 and 60 but these play a relatively minor role and the flexure of the spring bar 41 may for practical purposes be considered as the snap action positive holding means. The flattened portions 45 on bearings 44 are provided for clearance at the outer ends of slots 57 and 58 as viewed in FIGURE 2 while keeping total slot length and hence the maximum frame dimension to a minimum value.

We have elected to illustrate our invention as it is rendered in a double valve assembly but it is equally useful in a single valve assembly, a washing machine drain valve, for example. In a single valve assembly, considering valve 24 of FIGURES 1 and 2 as the single valve for example, the plates 12 and 13 may be the facing legs of a U-shaped member terminating at the bse of slots 58. In this case only one operator 40 will be utilized and the connecting rod and bearing portions 47, 48, 49 and 50 may be symmetrical about the center line of the operator 40. The operation of a single valve assembly differs from the dual valve assembly in that the snap force moving the crank to its final valve open position is provided by the stresses built up in the flattened portion 27 of the valve element as it is opened. This force is less than the force generated by stress in the bar 41 when the valve is closed but is sufficient to snap the crank to its final valve open position. The foregoing force in the open valve element is also present in the illustrated dual valve assembly but is dominated by the greater force generated by flexure of the bar 41 associated with the closed valve element.

The present construction does not require close manufacturing tolerances as wide tolerance variations may be accommodated by the flexure of the valve elements and bars 41. The pins 32 and 60 may be ordinary finish nails. Since pins 32 are essentially stationary they are properly a part of the frame structure but separate pins generally will be the most economical structure.

The economy and ease of manufacture of our valve structure results from a design in which all metal parts are very simple and easily fabricated or procured. The non-metallic parts comprise the rubber (or similar material) valve conduit and an operator which is a single molding of plastic material which performs a number of functions in the complete valve assembly.

While we have described a preferred embodiment of our invention we do not wish to be limited to the illustrated embodiment. For example, a simplification of metal fabrication at the cost of a slightly more complex operator molding may be achieved by eliminating the slots 57 and 58 in the frame plates and molding the operator with channels on the outer ends of the bar 41 to receive the frame plates. The opposing edge walls of the channels engaging the edges of the frame plates will have curved center sections to permit the operator to rock and flat flared end sections to act as fixed stops against the edges of the plates. The ends of the pins 60 in such a structure would be snapped into the bores in molded bosses in the operator in the manner in which crank 26 is snapped into bore 49.

We claim:
1. A pinch valve structure comprising:
   (a) a support having facing, spaced side frame elements,
   (b) a valve conduit extending between said frame elements parallel to the facing surfaces of said frame elements,
   (c) said valve conduit having a pinch valve section,
   (d) first pinch means for securing one surface of said pinch valve section to said support,
   (e) a crank means mounted in said frame elements and spaced from the other side of said pinch valve section,
   (f) a valve opening and closing means comprising bearing means slidably and rockably engaging each of said frame elements, means interconnecting said bearing means, a connecting rod means rotatably secured to said crank and attached to said interconnecting means between said bearing means, second pinch means connecting said bearing means and the other surface of said pinch valve means, and stop means positioned to engage said frame elements to limit motion of said crank between valve open and valve closed positions.

2. Apparatus as claimed in claim 1 wherein said frame elements are provided with elongated slots receiving said bearing means and said stop means, said interconnecting means forms a spring means, said stop means are positioned to arrest motion of said crank slightly past its dead-center positions, said pinch valve is molded to be nearly closed in its unstressed condition and the distance between said crank in its dead-center position when moving to valve closed position and said first pinch means is less than the distance from said crank to said second pinch means plus thickness of said second pinch means and the thickness of the walls of said pinch valve section when said spring means is unstressed whereby said crank is snapped over-center to valve closed position by said spring means to limit allowed by said stop means and is snapped over-center to valve open position to the limit allowed by said stop means by the stress in said pinch valve section when opened.

3. Apparatus as claimed in claim 2 wherein said bearing means, said interconnecting means, said connecting rod means and said stop means are integral parts of a single body of resilient plastic material.

4. Apparatus as claimed in claim 2 wherein said interconnecting means carries side thrust plates on its ends slidably engaging said frame elements.

5. Apparatus according to claim 2 wherein said bearing means, said interconnecting means, said connecting rod means and said stop means are integral parts of a single body of resilient plastic material and said interconnecting means carries side thrust plates on its ends slidably engaging said frame elements.

6. A dual pinch valve structure comprising:
   (a) a support having facing, spaced side frame elements,
   (b) a pair of valve conduits extending between said frame elements adjacent opposite ends thereof and parallel to the facing surfaces thereof,
   (c) said valve conduits each including a pinch valve section,
   (d) first pinch means for securing the outer surfaces of said pinch valve sections to said support,
   (e) crank means rotatably mounted on said frame elements between and spaced from said pinch valve sections,
   (f) a pair of valve opening and closing means each comprising bearing means slidably and rockably engaging each of said frame elements, means interconnecting said bearing means, a connecting rod means rotatably secured to said crank and attached to said interconnecting means between said bearing means, second pinch means connecting said bearing means and the other surface of said pinch valve means, and stop means positioned to engage said frame elements to limit motion of said crank between valve open and valve closed positions, whereby said pinch valve sections are alternately opened and closed.

7. Apparatus as claimed in claim 6 wherein said bearing means, said interconnecting means, said connecting rod means and said stop means for each valve opening and closing means are integral parts of a single body of resilient plastic material.

8. Apparatus as claimed in claim 6 wherein said stop means are positioned to arrest motion of said crank slightly past its dead-center positions, said interconnecting means form spring means, and the distance between said crank in its dead-center position with respect to the closed pinch valve section and the first pinch means associated with said pinch valve section is less than the distance from said crank to said second pinch means plus the thickness of said second pinch means and the thickness of the walls of said pinch valve section when said spring is unstressed whereby the spring means associated with the closed pinch valve section snap said crank into and holds it in each final operating position to the limit allowed by said stops.

References Cited

UNITED STATES PATENTS 2,313,550    3/1943    Huber _____ 251—7
3,156,444    11/1964    Black _____ 251—7

FOREIGN PATENTS 268,933    9/1950    Switzerland.

HENRY T. KLINKSIEK, Primary Examiner

U.S. Cl. X.R.

251—7